United States Patent [19]
Morse, Jr. et al.

[11] Patent Number: 5,695,133
[45] Date of Patent: Dec. 9, 1997

[54] THERMOPLASTIC WASHER/RECYCLER

[75] Inventors: William A. Morse, Jr., Sterling, Mass.; Francis X. Cavanagh, Easton, Conn.

[73] Assignee: Nova Chemicals (International) S.A., Switzerland

[21] Appl. No.: 665,908

[22] Filed: Jun. 19, 1996

[51] Int. Cl.⁶ .................... B02C 23/08; B02C 23/18
[52] U.S. Cl. .................... 241/42; 241/79.1; 241/157; 241/DIG. 38
[58] Field of Search .................... 241/41, 42, 65, 241/79.1, 157, DIG. 38

[56] References Cited

U.S. PATENT DOCUMENTS

| | | | |
|---|---|---|---|
| 5,143,308 | 9/1992 | Hally et al. | 241/76 |
| 5,174,316 | 12/1992 | Keller et al. | 134/104.3 |
| 5,180,437 | 1/1993 | Anderson et al. | 134/10 |
| 5,257,740 | 11/1993 | Prew et al. | 241/21 |
| 5,289,978 | 3/1994 | Lundquist | 241/57 |
| 5,328,104 | 7/1994 | Lima et al. | 241/24 |
| 5,336,842 | 8/1994 | Massholder et al. | 588/227 |
| 5,358,184 | 10/1994 | Skudrzyk | 241/16 |
| 5,566,890 | 10/1996 | Ricciardelli | 241/20 |

*Primary Examiner*—John M. Husar
*Attorney, Agent, or Firm*—Kenneth H. Johnson

[57] ABSTRACT

There are a number of devices for washing/recycling thermoplastic. However, the devices tend to be designed on a scale for use at a central site. Additionally, the devices currently available do not have a positive feed travel mechanism. Rather the devices permit the thermoplastic to be "pushed" through at a rate dependent on the feed rate. The present invention provides a compact washer/recycler having a positive feed travel which is designed to shred, wash, dry and compact plastic at the location of its use.

14 Claims, 1 Drawing Sheet

THERMOPLASTIC WASHER/RECYCLER

FIELD OF THE INVENTION

The present invention relates to the recycling of plastics. More particularly, the present invention relates to the recycling of thermoplastic, preferably from a dedicated source.

BACKGROUND OF THE INVENTION

The recycling of thermoplastic is becoming more of a concern in terms of the consumption of "non-renewable" resources and the expense of separating contaminated thermoplastic waste from other waste. Clearly there is a desire to provide methods to recycle thermoplastic waste in a cost effective manner. There are a number of aspects to the cost effectiveness of plastic recycling. The price of recycled plastic should not exceed that of virgin plastic. On the other hand, typically plastic recycling requires some manual labor to separate plastic from waste streams. Whether this is done by the consumer, through "blue boxes" or at a processing center, there is still a significant amount of "labor involved". Finally, having separated the waste thermoplastic there is a need to wash it and to compact it to a density so that it is cost effective to transport to other processors.

U.S. Pat. No. 5,180,437 issued Jan. 19, 1993 to Anderson et al. discloses a device to wash waste plastic in which one of the essential features is a sloped rotating drum having internal headers to spray wash and rinse water onto the waste plastic. The plastic travels through the drum assisted by the slope of the drum and its rotation. The present device has eliminated the rotating drum of the reference. Additionally, the reference teaches that the washing occurs due to the spray from the headers and the mechanical action of the rotation of the drum and the collision of the plastic within the drum. The Anderson device recycles water and as a result dirt in the recycle stream may cause the nozzles to become plugged. Additionally, Anderson does not disclose a positive feed control which the present invention requires. There is no footer in the device of the reference to provide an opposing spray of water to wash the plastic. In short, the reference teaches away from the device of the present invention.

U.S. Pat. No. 5,174,316 issued Dec. 29, 1992 to Keller et al. discloses an apparatus to shred and wash recyclable thermoplastic. The washing is achieved by passing water containing shredded thermoplastic thought a series of pipes having a number of right angle bends in them and also having impactor bars within the pipes. The washing action is primarily mechanical due to the collision of the plastic particles among themselves, with the pipe, and with the impactor bars. The reference teaches away from the system of the present invention.

U.S. Pat. No. 5,143,308 issued Sep. 1, 1992 to Hally et al. teaches a process for recovering PET. In the process, PET is manually removed from waste shredded and then classified by air separation and then by a water separation. In the water classification the plastic is moved through a tank of water by the water flow. There is no positive feed conveyor as required in the present invention.

The present invention seeks to provide a simple effective method to recover waste plastic typically contaminated with food residues.

SUMMARY OF THE INVENTION

The present invention provides a compact thermoplastic recycler comprising in cooperating arrangement:

1. a load section to receive waste thermoplastic material comprising interacting rotary blades and blocks, to shred uncleaned thermoplastic into particles having a dimension from about 1 to 1½ inches wide and a length equal to the length of the original item (typically not more than about 12, preferably about 8 inches) which shredder feeds on to;

2. a conveyor means consisting at least a pair of parallel spaced apart cog drive wheels and at least a pair of parallel spaced apart tension wheels and of a parallel pair of continuous chains having attached therebetween uniform upward extending flights spaced apart at a distance from 6 to 18 inches, said conveyor spaced above and traveling over a small mesh open bed and sequentially passing through a closed cabinet divided into a prewash zone, a wash zone, a rinse zone and a drying zone; said conveyor moving at a speed to provide a residence time in said prewash zone from 5 to 30 seconds; a residence time in said wash zone from 5 to 30 seconds; a residence time in said rinse zone from 5 to 15 seconds; and a time in said dryer zone from 5 to 30 seconds;

3. said prewash zone having from 4 to 6 evenly spaced headers from 3 to 5 inches above said bed and 4 to 6 evenly spaced footers from 2 to 4 inches below said bed, said headers and footers having nozzles thereon spaced from 6 to 12 inches apart to spray hot water received from said wash zone onto the thermoplastic traveling on said bed through said prewash zone and said cabinet having a filter placed between said footers and a drain section in the bottom of said cabinet to drain said water and contaminants from said cabinet;

4. said wash zone also having from 4 to 6 evenly spaced headers from 3 to 5 inches above said bed and 4 to 6 evenly spaced footers from 2 to 4 inches below said bed, said headers and footers having nozzles thereon spaced from 6 to 12 inches apart to spray hot water received from said rinse zone onto the thermoplastic traveling on said bed through said wash zone, said wash zone in said cabinet having a filter placed between said footer and a tank in the bottom of said wash zone, said tank having a pump which pumps the water collected in said tank to the headers and footers in said prewash zone;

5. said rinse zone also having from 4 to 6 evenly spaced headers from 3 to 5 inches above said bed and 4 to 6 evenly spaced footers from 2 to 4 inches below said bed, said headers and footers having nozzles therein spaced from 6 to 12 inches apart to spray hot water received from a hot water source onto the thermoplastic traveling on said bed through said rinse zone, said rinse zone in said cabinet having an exhaust fan in its upper surface to vent hot air and water vapor and a filter placed between said footer and a tank in the bottom of said rinse zone, said tank having a pump which pumps the water collected in said tank to the headers and footers in said wash zone;

6. a drying zone having a blower recirculating air within said drying zone over heaters and feeding a duct in the bottom of said zone to distribute an upward flow of hot air through said bed, said dryer having a discharge at the end of the conveyor to discharge dried and clean shredded thermoplastic.

DETAILED DESCRIPTION

Figure 1:
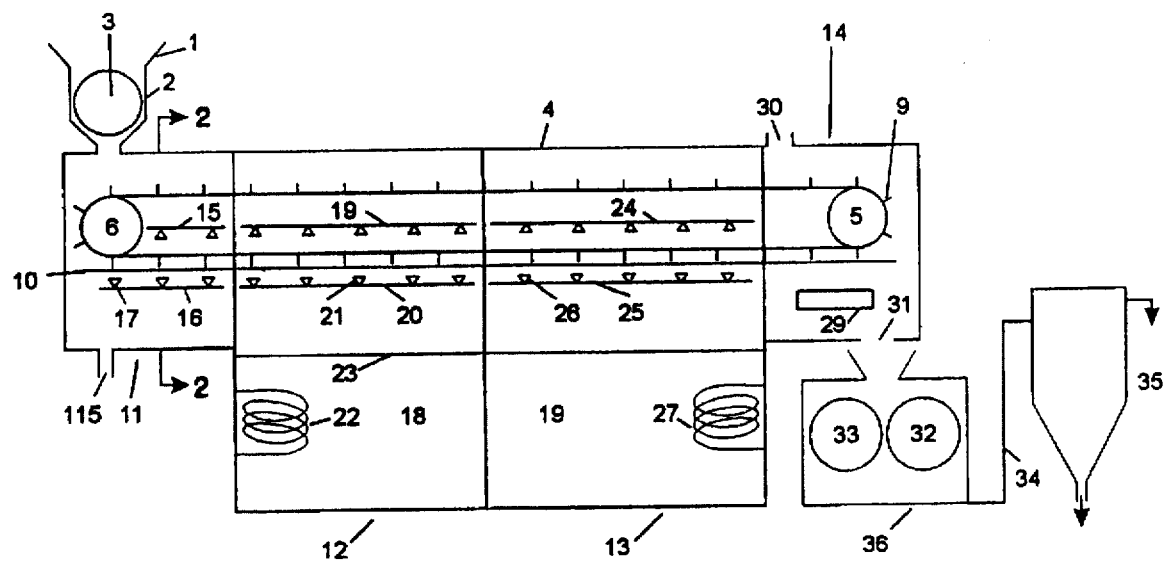
FIG. 1 is a schematic longitudinal sectional view of an apparatus of the present invention.
Figure 2:
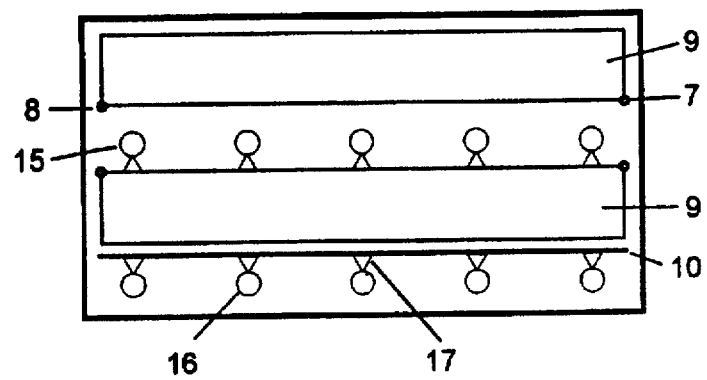
FIG. 2 is a section view at 2—2 of the conveyor and headers and footers in the prewash section.

The present invention will be described in conjunction with the drawings in which like parts have the same number.

The device of the present invention is useful in the shredding and washing of contaminated thermoplastic waste. The plastic waste may be of any type including styrenic polymers such as polystyrene, styrene acrylonitrile polymers (SAN), styrene acrylics, impact modified versions of the above polymers such as high impact polystyrene (HIPS), acrylonitrile butadiene styrene polymers (ABS) and impact modified styrene acrylates. The thermoplastic may be a polyolefin such as polyethylene or polypropylene. The thermoplastic may be a polyester such as polyethylene terephthalate (PET) or polybutylene terephthalate (PBT).

Typically, polystyrene is a homopolymer of a $C_{8-12}$ vinyl aromatic monomer which is unsubstituted or substituted by a $C_{1-4}$ alkyl radical. Suitable monomers include styrene, alpha methyl styrene, p-methyl styrene and t-butyl styrene.

Styrene acrylonitrile polymers typically comprise from 55 to 95, preferably from 70 to 90 weight % of a $C_{8-12}$ vinyl aromatic monomer and from 45 to 5, preferably from 30 to 10 weight % of a nitrile monomer selected from the group consisting of acrylonitrile and methacrylonitrile, preferably acrylonitrile. Suitable vinyl aromatic monomers have been listed above.

Typically styrene acrylates comprise from 50 to 90 weight % of one or more $C_{8-12}$ vinyl aromatic monomers and from 50 to 10 weight % of one or more $C_{1-6}$, preferably $C_{1-4}$, alkyl esters of acrylic or methacrylic acid. Suitable vinyl aromatic monomers have been listed above. Suitable ester monomers include methyl methacrylate, ethyl methacrylate, methyl acrylate, ethyl acrylate, and butyl acrylate.

The above polymers may be impact modified. That is the polymers may be grafted on to up to about 40, preferably from about 5 to 30 weight of a rubbery polymer. Suitable rubbers include styrene butadiene rubbers comprising from about 60 to 40 weight % of a $C_{8-12}$ vinyl aromatic monomer and from 40 to 60 weight % of one or more $C_{4-6}$ conjugated diolefins which are unsubstituted or may be substituted by one or more halogen atoms. Suitable vinyl aromatic monomers have been listed above. Suitable conjugated diolefin monomers include butadiene, and isoprene, preferably butadiene. The SBR rubbers may be random copolymers or block polymers including block, star or radial polymers and tapered polymers. The rubber may also be a co- or homopolymer, preferably a homopolymer of one or more $C_{4-6}$ conjugated diolefins. Suitable conjugated diolefins have been listed above. Preferably the rubber is polybutadiene which may have a stereo configuration so that from about 50 to 95% of the polymer is in the cis configuration. For the styrene acrylate while the above rubbers may be used preferably the rubber is an acrylate comprising a homopolymer of butyl acrylate or a copolymer of butyl acrylate and ethylhexyl acrylate.

The olefin polymers may comprise from 100 to about 75, preferably from 100 to about 80 weight % of a $C_{2-3}$ alpha olefin and from 0 to 25, preferably 20 weight % of one or more $C_{4-8}$ alpha olefins. Suitable $C_{2-3}$ alpha olefins include ethylene and propylene. Suitable $C_{4-8}$ alpha include butene, hexene and octene.

The thermoplastic may be a polyester which may be aliphatic or aromatic. The aliphatic polyesters include polymers of lactic acid and glycolic acid as well as the copolymers of butyric and valeric acid (PHBV's). The lactide and glycolides may be produced by "traditional chemistry" from monomers produced by a fermentation process and the PHBV's may be produced directly by fermentation or biological processes. The aromatic polyesters are the more conventional polyesters typically comprising from 50 to 80 weight % of one or more $C_{8-14}$ aromatic dicarboxylic acids and lower ($C_{1-4}$) alkyl esters thereof; from 20 to 50 weight % of one or more monomers selected from the group consisting of $C_{2-10}$ alkylene glycols, $C_{6-10}$ cyclic glycols (e.g. cyclohexanediol or cyclohexandimethanol) and mixtures thereof, and optionally from 0 to 10 weight % of one or more $C_{3-12}$ saturated dicarboxylic acids. Some $C_{8-12}$ aromatic acids and $C_{1-4}$ alkyl esters thereof include terephthalic acid and dimethyl terephthalate (DMT). Some $C_{2-10}$ alkylene glycols include ethylene glycol, propylene glycol butylene glycol and their higher homologues such as 1,10-decamethylene glycol. Particularly useful glycols are ethylene glycol used in the manufacture of PET (polyethylene terephthalate) and butylene glycol used in the manufacture of PBT (polybutylene terephthalate). The polyesters may also include a $C_{6-10}$ cylclic glycol to produce the "G" versions of the above polyesters (e.g. PETG).

Preferably the device of the present invention is used in association with a unified source of thermoplastic in an institution such as a hospital or school or in a commercial establishment such as a restaurant or an airline. The plastic used, for example, in the serving of food is essentially of one type or compatible polymers (e.g. polystyrene and HIPS and SAN and ABS). Such a unified source of plastic eliminates the need for sorting of thermoplastic contaminated with food waste.

The device of the present invention is designed to be compact so that is could easily fit into a small area such as a fast food restaurant or the cafeteria of a public or high school. The device may be from about 12 to 25, preferably about 24 to 28 feet long, have a width from about 3 to 5, preferably 4 feet and have a height from about 5 to 10, preferably from about 6 to 8 feet. However, the present invention also contemplates a more compact device which may be used in smaller spaces. Typically such a device would have a length from about 5 to 8 feet, a width of from about 2 to 3, preferably about 2 feet, and a height from about 5 to 8, preferably about 5 to 6 feet.

The waste thermoplastic is fed into a receiving section comprising a hopper 1, a granulator 2, having one or more rotating drums 3 therein having interlocking protrusions on their surface, or some equivalent device for cutting or shredding the plastic such as rotating disc knives. The shredder reduces the plastic to a dimension of less than about 2, preferably less than 1.75, most preferably less than about 1.5 inches (about 5 cm, preferably less than 4.4 cm, most preferably less than about 3.8 cm). The shredder may be located on top of the device as shown in FIG. 1 in which case the shredded plastic feed falls into the cabinet of the device generally indicated by 4. In an alternate embodiment the shredder may be substantially lower, for example at floor or knee height, and the shredder feeds an inclined conveyor which conveys shredded plastic to the top of and into the cabinet for the device.

Within the device and traversing substantially the length of the cabinet is a conveyor means. The conveyor means comprises at least one pair of parallel spaced apart cog drive wheels 5; at least one pair of parallel spaced apart cog tension wheels 6 and at least two parallel spaced apart continuous drive chains 7 and 8 passing around and cooperating with drive wheels 5 and tension wheels 6. The spacing between the parallel cog wheels (and chains) may be from 30 to 40, preferably about 36 inches. The drive and tension cog wheels are mounted on separate axles. The axle of the pair of parallel spaced apart drive cog wheels extends through the side of the cabinet and is driven by a suitable drive means such as an electric motor with a reduction gear if necessary. Uniform flights 9 are attached to the drive chains and upwardly extend above the outwardly facing surface of said drive chains. The spacing between the flights is from about 6 to 18, preferably about 10 to 12 inches. Typically the flights could have a height from 3 to 6, preferably from 3 to 5 inches. Disposed adjacent to the bottom edge of the downwardly extending flights on the bottom of the conveyor means is a small open mesh bed. The mesh size is typically ¼ inch or smaller.

The cabinet is divided into four zones or sections: a prewash section indicated at 11, a wash section indicated at 12, a rinse section indicated at 13 and a drying section indicated at 14. Typically, in the larger device of the present invention the load section is from 20 to 40, preferably 30 inches long; the prewash section is from 30 to 50, preferably 48 inches long; the wash section is from 30 to 50, preferably 48 inches long; and the dryer section is from 18 to 30, preferably 24 inches long. If the conveyor speed is controlled to about 12 feet per minute the below noted residence times are obtained when the preferred dimensions of the zones or sections in the device are used. In the smaller or more compact device contemplated by the present invention the lengths of the sections would be reduced accordingly (e.g. the drive chains would be from 10 to 18 inches apart, the load would be from about 8 to 15 inches; the prewash would be from 10 to 16 inches, the wash section would be from 10 to 16 inches, the rinse section would be 5 to 12 inches and the drying section would be from 15 to 20 inches, and the conveyor speed would be about 2 to 4 feet per minute). However, the positive feed of the device of the present invention permits slowing the speed of passage through the device so that the conveyor speed would also be shortened to give the required residence time in the device. If desired the conveyor may be operated intermittently for example to increase the drying time (while the wash section could be "shut down".

The shredded contaminated thermoplastic falls from the shredder into the prewash section 11 of the cabinet. In the prewash section of the cabinet are headers 15 and footers 16 having nozzles 17 attached thereto. The headers and footers may be vertically offset relative to each other. The headers are located above the bottom edge of the chains about 3 to 5 inches above the bed and the footers are placed about 2 to 4 inches below the open mesh bed. The headers receive water from tank 18 in the bottom of the wash section of the cabinet by means of a pump (not shown). As the shredded plastic travels over the open mesh bed the headers and footers spray the plastic with water, preferably heated to about 160° to 190°, most preferably from 170° to 180° F. (about 70° to 90°, preferably 75° to 80° C.). The loose contaminants are washed off the plastic and the water descends to the bottom of prewash section 11 of the cabinet and leaves through drain 115.

The speed of the drive wheel 5 is controlled so that the residence time in the prewash section is from 5 to 30, preferable 20 seconds. The ratio of the dimensions of the remaining sections of the cabinet will result in a residence time in the wash section being from 5 to 30, preferably 20 seconds, a residence time in the rinse section of from 5 to 15, preferably 10 seconds, and a residence time in the drying section of from 5 to 30, preferably 20 seconds.

The conveyor means then moves the plastic material into the wash section of the device. The upper portion of the wash section is essentially similar in construction to the prewash section. The headers 19 and footers 20 are separate from the headers 15 and footers 16 in the prewash section but in a similar spatial arrangement as the prewash section. The headers 19 and footers 20 also have nozzles 21 which may be the same or different from the nozzles 17 in the prewash section of the device.

As noted earlier in the bottom of the wash section is a tank 18, which extends substantially the length and width of the wash section and collects the water sprayed onto the plastic from the headers and footers. The tank may contain an immersion heating device 22. Below the footers and above the top of the tank 18 is a filter 23 to remove the nonsoluble contaminants from the wash water.

In the wash section the headers receive water from tank 19 in the bottom of the rinse section via a pump (not shown).

The conveyor draws the shredded and washed thermoplastic from the wash zone or section to the rinse section. The construction of the rinse section is essentially the same as the wash section. Again the headers 24 and footers 25 in the same spatial arrangement as in the prewash section or zone (and also the wash section or zone) are separate from the headers and footers in the wash section. The nozzles 26 on the headers and footers may be the same or different from the nozzles used in the prewash section or the wash section. The headers and footers receive heated water from a hot water source such as a hot water tank (not shown). The tank 19 in the bottom of the rinse section which extends for substantially the length and width of the rinse section may contain an immersion heater 27. In the rinse section as in the wash section there is a filter 28 above the tank to remove any insoluble matter from the rinse water before it is passed on to the wash section.

The conveyor then passes the thermoplastic to the drying section of the device. In the drying section there is a blower or fan (not shown) which draws hot air from the dryer section and passes it through a heater such as an electrical heater or through a heated plenum. The hot air is fed into a duct 29 at the bottom of the drying section. The drying section also has an exhaust 30 for hot air and water vapor. When the plastic reaches the end of the open mesh bed it falls from the bed into the discharge 31.

The basic design of the device has been described above. However, in a preferred embodiment of the invention the discharge may open into a second granular 36 comprising rotating cutter blades 32 and 33 to further reduce the size of particles down to below about ⅛ of an inch (0.4 cm) or less. The fine flakes from the granulator may be transported by a pneumatic conveyor 34 to a cyclone 35 which separates the feed or granules to a light conveying air overhead fraction and a heavier product bottom fraction. The plastic being processed covers a wide range of products (e.g. foamed polystyrene from items such as hot drink cups or "clam shells" (fast food containers)) and relatively dense plastic (e.g. rigid unfoamed polystyrene from items such as cutlery). The flaked plastic may be extruded and palletized to increase the density of the recycled plastic to make transportation economical and to provide customers with a ready material to thermoform or mold.

What is claimed is:

1. A compact thermoplastic recycler comprising in cooperating arrangement:
   1. a load section to receive waste thermoplastic material comprising interacting rotary blades and blocks, to shred uncleaned thermoplastic into particles having a dimension of less than about 1.5 inches wide which shredder feeds on to;

2. a continuous conveyor means consisting of a pair of continuous spaced apart parallel chain drives having attached therebetween upward extending flights spaced apart at a distance from 6 to 18 inches, said conveyor traveling over a small open mesh bed and sequentially passing through a unitary cabinet divided into a prewash zone, a wash zone, a rinse zone and a drying zone; said conveyor moving at a speed to provide a residence time in said prewash zone from 5 to 30 seconds; a residence time in said wash zone from 5 to 30 seconds; a residence time in said rinse zone from 5 to 15 seconds; and a time in said dryer zone from 5 to 30 seconds;

3. said prewash zone having from 4 to 6 evenly spaced headers from 3 to 5 inches above said bed and 4 to 6 evenly spaced footers from 2 to 4 inches below said bed, said headers and footers having nozzles thereon spaced from 6 to 12 inches apart to spray hot water received from said wash zone onto the thermoplastic traveling on said bed through said prewash zone and said cabinet having a filter placed between said footers and a drain section in the bottom of said cabinet to drain said water and contaminants from said cabinet;

4. said wash zone having from 4 to 6 evenly spaced headers from 3 to 5 inches above said bed and 4 to 6 evenly spaced footers from 2 to 4 inches below said bed, said headers and footers having nozzles thereon spaced from 6 to 12 inches apart to spray hot water received from said rinse zone onto the thermoplastic traveling on said bed through said wash zone, said wash zone in said cabinet having a filter placed between said footer and a tank in the bottom of said wash zone, said tank having a pump which pumps the water collected in said tank to the headers and footers in said prewash zone;

5. said rinse zone also having from 4 to 6 evenly spaced headers from 3 to 5 inches above said bed and 4 to 6 evenly spaced footers from 2 to 4 inches below said bed, said headers and footers having nozzles therein spaced from 6 to 12 inches apart to spray hot water received from a hot water source onto the thermoplastic traveling on said bed through said rinse zone, said rinse zone in said cabinet having an exhaust fan in its upper surface to vent hot air and water vapor and a filter placed between said footer and a tank in the bottom of said rinse zone, said tank having a pump which pumps the water collected in said tank to the headers and footers in said wash zone;

6. a drying zone having a blower recirculating air within said drying zone over heaters and feeding a duct in the bottom of said zone to distribute an upward flow of hot air through said bed, said dryer having a discharge at the end of the conveyor to discharge dried and clean shredded thermoplastic.

2. The recycler according to claim 1, further having at least one immersion heater in the tanks in the bottom of said rinse zone and the bottom of said wash zone.

3. The recycler according to claim 2 having a length from 12 to 25 feet, a height from 5 to 10 feet and a width of not greater than 4 feet.

4. The recycler according to claim 3, wherein said parallel chain drives are spaced apart a distance from 30 to 40 inches.

5. The recycler according to claim 4, wherein said load section is from 20 to 40 inches long, said prewash section is from 30 to 50 inches long; said wash section is from 30 to 50 inches long; said rinse section is from 18 to 30 inches long; and said drying section is from 48 to 60 inches long.

6. The recycler according to claim 5, further comprising a granulator which cooperates with and receives clean dry plastic and granulates it to a size of less than a quarter of an inch.

7. The recycler according to claim 6, further comprising a cyclone which receives the granules from said granulator and separates it into a light conveying air overhead fraction and a heavier product bottom fraction.

8. The recycler according to claim 5, having a conveyor rate of 3 to 12 feet per minute.

9. The recycler according to claim 2, having a length of from 5 to 8 feet, a height from 5 to 6 feet and a width of not greater than 3 feet.

10. The recycler according to claim 8, wherein said parallel chain drives are spaced apart a distance from 10 to 18 inches.

11. The recycler according to claim 9, wherein said load section is from 8 to 15 inches long, said prewash section is from 10 to 16 inches long, said wash section is from 10 to 16 inches long, said rinse section is from 5 to 12 inches long, and said drying section is from 15 to 20 inches long.

12. The recycler according to claim 11, further comprising a granulator which cooperates with and receives clean dry plastic and granulates it to a size of less than a quarter of an inch.

13. The recycler according to claim 12, further comprising a cyclone which receives the granules from said granulator and separates it into a light conveying air overhead fraction and a heavier product bottom fraction.

14. The recycler according to claim 11, having a conveyor rate of 2 to 3 feet per minute.

* * * * *